(12) United States Patent
Wang et al.

(10) Patent No.: US 11,187,845 B2
(45) Date of Patent: Nov. 30, 2021

(54) BACKLIGHT MODULE

(71) Applicant: Optivision Technology Inc., Hsinchu (TW)

(72) Inventors: Chung-Wei Wang, Hsinchu (TW); Li-Jen Hsu, Zhuangwei Township, Yilan County (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 8 days.

(21) Appl. No.: 16/943,747

(22) Filed: Jul. 30, 2020

(65) Prior Publication Data
US 2021/0325597 A1    Oct. 21, 2021

(30) Foreign Application Priority Data

Apr. 20, 2020 (TW) ................................ 109113169

(51) Int. Cl.
*F21V 8/00* (2006.01)
*G02B 5/00* (2006.01)

(52) U.S. Cl.
CPC .......... *G02B 6/0055* (2013.01); *G02B 5/003* (2013.01); *G02B 6/005* (2013.01); *G02B 6/0053* (2013.01)

(58) Field of Classification Search
USPC ...................................................... 362/606
See application file for complete search history.

(56) References Cited

U.S. PATENT DOCUMENTS

| 10,545,278 B2 * | 1/2020 | Lee ...................... G02B 6/0031 |
| 2014/0029239 A1* | 1/2014 | Oh ............................ G02B 1/11 362/84 |
| 2016/0116664 A1* | 4/2016 | Wheatley ............. G02B 6/0075 362/19 |
| 2016/0131927 A1* | 5/2016 | Maesawa .......... G02F 1/133524 349/57 |

(Continued)

FOREIGN PATENT DOCUMENTS

| JP | 2009-277388 A | 11/2009 |
| TW | 202004237 A | 1/2020 |
| TW | M599031 U | 7/2020 |

OTHER PUBLICATIONS

Search Report appended to an Office Action, which was issued to Taiwanese counterpart application No. 109113169 by the TIPO dated Dec. 18, 2020 with an English translation thereof (2 pages).

*Primary Examiner* — Bryon T Gyllstrom
(74) *Attorney, Agent, or Firm* — Hamre, Schumann, Mueller & Larson, P.C.

(57) ABSTRACT

A backlight module includes a light guide plate, a light source, a prism sheet, and a reflective film. The light source is disposed on a light-incident surface of the light guide plate. The prism sheet is disposed on a light exit surface of the light guide plate, and includes a plurality of first prism structures that protrude toward the light exit surface of the light guide plate. The reflective film is disposed on a reflection surface of the light guide plate, and includes a film body, a plurality of second prism structures that are disposed on the film body and that protrude from the film body toward the reflection surface, and a light absorbing layer that is disposed on the film body opposite to the second prism structures.

17 Claims, 8 Drawing Sheets

(56) References Cited

U.S. PATENT DOCUMENTS

2017/0235036 A1\* 8/2017 Nichol ................. G02B 6/0028
                                                        362/606
2018/0231826 A1\* 8/2018 Oh .................... G02F 1/133502
2018/0274740 A1\* 9/2018 Watanabe .............. G02B 6/005
2018/0364408 A1\* 12/2018 Hwang ................ G02B 5/0242

\* cited by examiner

BACKLIGHT MODULE

CROSS-REFERENCE TO RELATED APPLICATION

This application claims priority of Taiwanese Invention Patent Application No. 109113169, filed on Apr. 20, 2020.

FIELD

The disclosure relates to a backlight module, and more particularly to a backlight module having a reduced light-emitting angle.

BACKGROUND in recent years, liquid crystal display (LCD) screens have been widely used in various electronic devices. Since electronic devices are frequently used in public space, there is a need of LCD screens having anti-peeping function for privacy concerns. Due to the characteristics of LCD, the LCD screen requires a backlight module to provide a backlight thereto for displaying images. Referring to FIG. 1, a conventional backlight module 8 includes a light source 81 that is disposed adjacent to a light guide plate 83, and a reflector 82, the light guide plate 83, a lower diffuser 84, a prism sheet 85 and an upper diffuser 86 fora bright enhancement layer) that are sequentially disposed on one another in a direction from bottom to top. The light guide plate 83, which has a light exit surface 831 and a bottom surface 832 opposite thereto, is a main component in the backlight module 8 for directing light to the LCD screen. In order to allow a light to be directed out of the light guide plate 83 through the light exit surface 831, a microstructure (such as a dot pattern) is disposed at the bottom surface 832 of the light guide plate 83 for reflecting and diffusing the light at various angles so as to prevent total reflection and interference of the light traveling in the light guide plate 83. However, a light directed out of the light guide plate 83 through the light exit surface 831 might be reflected back and forth between the prism sheet 85 and the reflector 82. Specifically, when a light leaving the light guide plate 83 through the bottom surface 832 is incident on the reflector 82, the light would be reflected back to pass through the light guide plate 83 and then enters the prism sheet 85. If the reflected light entering the prism sheet 85 undergoes total reflection, the reflected light would be further reflected back to the light guide plate 83. The more times the light being reflected between the prism sheet 85 and the reflector 82, the more energy the light lost, resulting in a reduced brightness of the LCD screen. Furthermore, as the light might be emitted at a larger angle through the upper diffuser 86, the contents displayed on the LCD screen might still be easily seen by others, and thus the LCD screen is devoid of anti-peeping function.

Referring to FIG. 2, another conventional backlight module 9 includes a light source 91 that is disposed adjacent to a light guide plate 93, and a reflector 92, the light guide plate 93 and a reverse prism sheet 94 that are sequentially disposed on one another in a direction from bottom to top. The reverse prism sheet 94 has a prism structure extending toward the light guide plate 93. Compared with the aforesaid backlight module 8 shown in FIG. 1, by virtue of the reverse prism sheet 94, the backlight module 9 might provide a backlight having a higher brightness and a lower light-emitting angle, but still falls short of conferring anti-peeping function to the LCD screen.

SUMMARY

Therefore, an object of the disclosure is to provide a backlight module that can alleviate or eliminate at least one of the drawbacks of the prior art.

According to the disclosure, the backlight module includes a light guide plate, a light source, a prism sheet, and a reflective film.

The light guide plate includes a light exit surface, a reflection surface that is opposite to the light exit surface, and a light-incident surface that interconnects the light exit surface and the reflection surface.

The light source is disposed on the light-incident surface of the light guide plate.

The prism sheet is disposed on the light exit surface of the light guide plate, and includes a plurality of first prism structures that protrude toward the light exit surface of the light guide plate.

The reflective film is disposed on the reflection surface of the light guide plate. The reflective film includes a film body, a plurality of second prism structures that are disposed on the film body and that protrude from the film body toward the reflection surface, and a light absorbing layer that is disposed on the film body opposite to the second prism structures.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
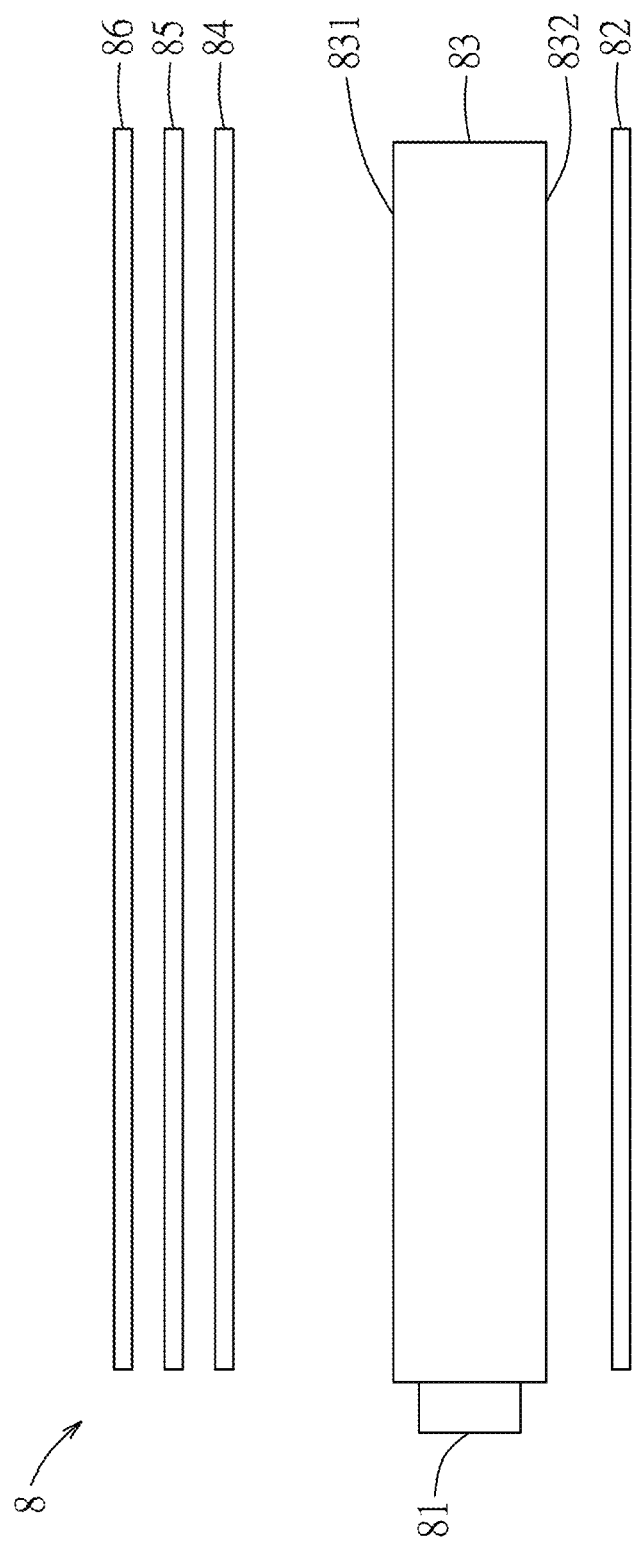
FIG. 1 is a schematic side view illustrating a conventional backlight module.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
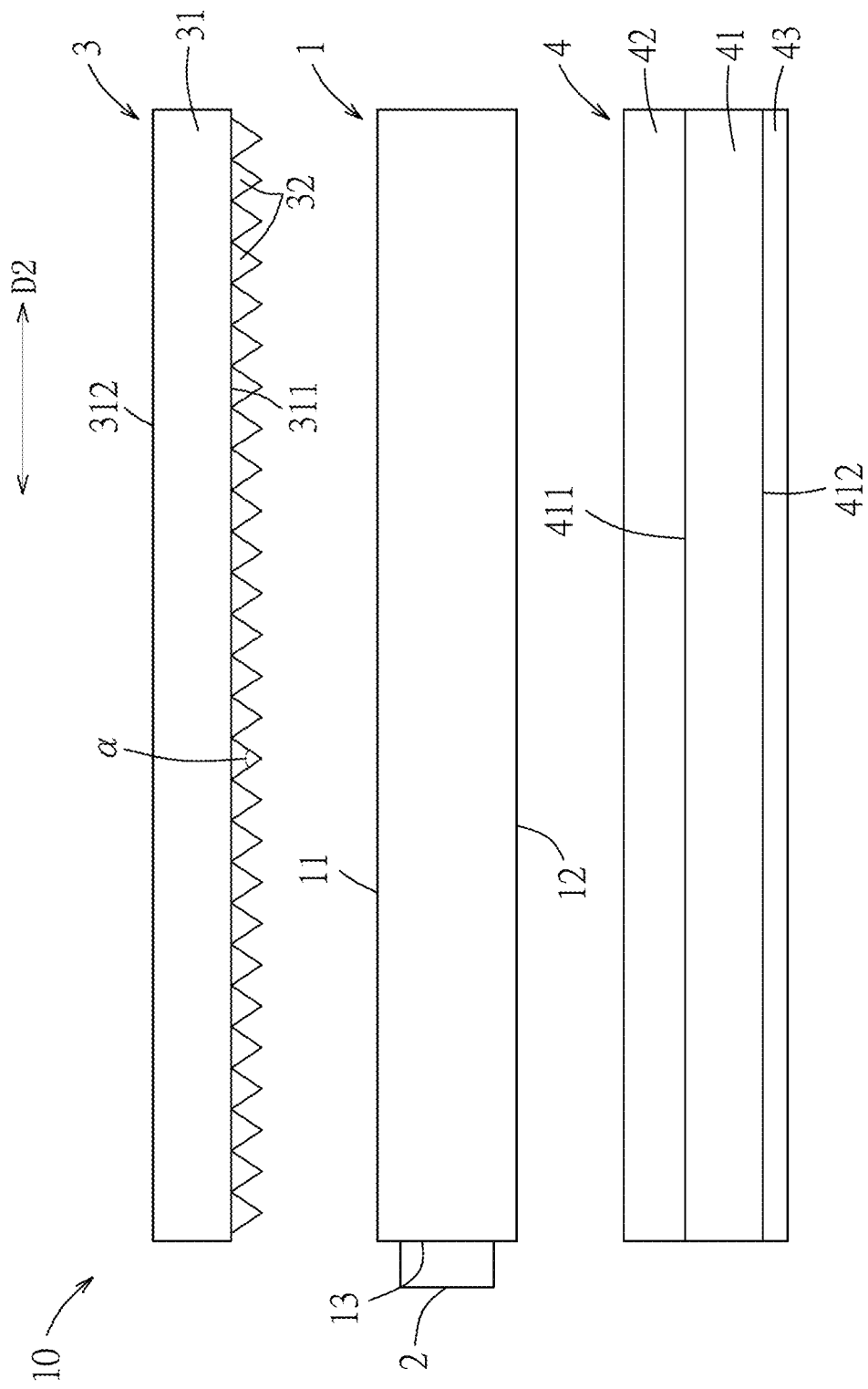
FIG. 3 is a schematic side view illustrating an embodiment of the backlight module according to the disclosure.
Figure 4:
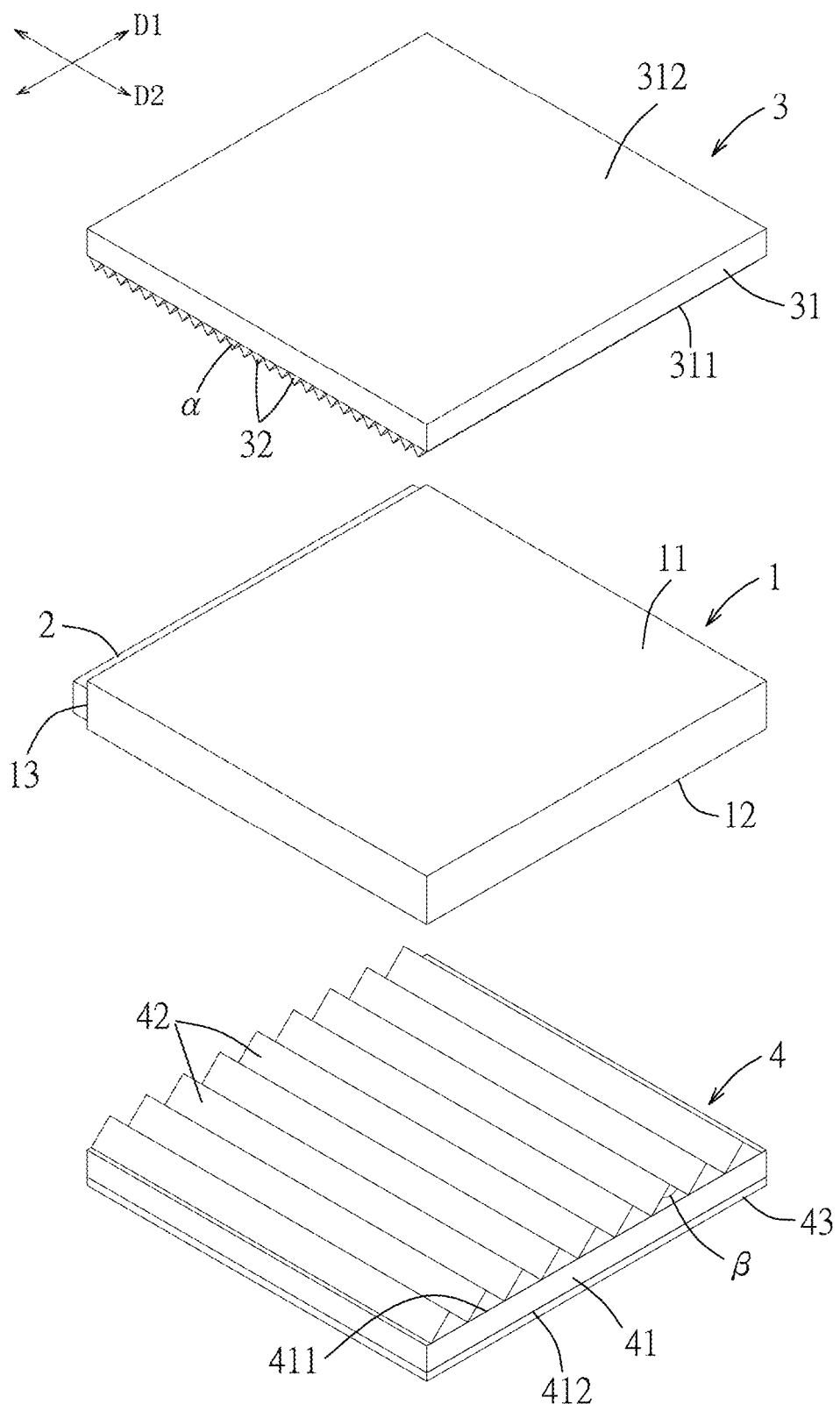
FIG. 4 is an exploded perspective view illustrating the embodiment of the backlight module according to the disclosure.

Referring to FIGS. 3 to 4, an embodiment of the backlight module 10 according to the present disclosure is adapted for use in a LCD screen of an electronic device (not shown) to emit a required backlight to the LCD screen, so as to confer anti-peeping function. The backlight module 10 includes a light guide plate 1, a light source 2, a prism sheet 3, and a reflective film 4.

The light guide plate 1 may be flat, and includes a light exit surface 11 that faces toward the prism sheet 3, a reflection surface 12 that is opposite to the light exit surface 11 and that faces toward the reflective film 4, and a light-incident surface 13 that interconnects the light exit surface 11 and the reflection surface 12.

The light source 2 is disposed on the light exit surface 11 of the light guide plate 1 and extends along a first direction D1. The light source 2 may be an LED light bar.

The light guide plate 1 may be formed with a plurality of dot patterns (not shown) on the reflection surface 12. The light emitted from the light source 2 enters the light guide plate 1 through the light-incident surface 13, and total reflection of the light in the light guide plate 1 is destroyed by the dot patterns such that the light is able to be directed out of the light guide plate 1, and is incident on and reflected by the reflective film 4. The reflected light is then transmitted in a direction toward the light exit surface 11.

The prism sheet 3 is disposed on the light exit surface 11 of the light guide plate 1. The prism sheet 3 includes a sheet body 31 and a plurality of first prism structures 32. The sheet body 31 has opposite first and second surface 311, 312. The first prism structures 32 are disposed on the first surface 311 of the sheet body 31 and protrude from the first surface 311 toward the light exit surface 11. In this embodiment, each of the first prism structures 32 is a triangular prism. That is, an apex of each of the first prism structures 32 is toward the light exit surface 11 of the light guide plate 1, such that as the light from the reflective film 4 is incident on and reflected by the first prism structures 32, the traveling path of the light can be changed, i.e., in a direction away from the light guide plate 1. The light reflected by the first prism structures 32 may then exit through the second surface 312 with a decreased light-emitting angle, such that the brightness of the LCD screen may be efficiently increased. The sheet body 31 may have a thickness of 100 μm, and each of the first prism structures 32 may have a height about 13 μm measured from the first surface 311 to the apex. In certain embodiments, each of the first prism structures 32 may independently have a first apical angle (α) ranging from 65° to 70°, such as 68°.

The reflective film 4 is disposed on the reflection surface 12 of the light guide plate 1. The reflective film 4 includes a film body 41, a plurality of second prism structures 42, and a light absorbing layer 43.

The film body 41 has a first surface 411 toward the light guide plate 1, and a second surface 412 opposite to the first surface 411. The film body 41 may be made of a thermoplastic polymeric material, such as polyethylene terephthalate (PET), polycarbonate (PC), polyimide (PI), and combinations thereof. The film body 41 may have a thickness of 100 μm. A refractive index of the film body 41 may range from 1.4 to 1.7. A transmittance of the film body 41 may be at least 80%. A fog density of the film body 41 may be not greater than 10%.

The second prism structures 42 are disposed on the first surface 411 of the film body 41 and protrude from the first surface 411 toward the reflection surface 12. In this embodiment, each of the second prism structures 42 is a triangular prism. That is, an apex of each of the second prism structures 42 is toward the reflection surface 12 of the light guide plate 1. Each of the second prism structures 42 may be made of a polymer composite material, such as a transparent ultraviolet gel, by virtue of a ultra-violet curing process. Each of the second prism structures 42 may have a refractive index ranging from 1.4 to 1.7, and a height around 25 μm measured from the first surface 411 to the apex. In certain embodiments, each of the second prism structures 42 has a second apical angle (β) ranging from 80° to 100°, such as 90°. In other embodiments, each of the second prism structures 42 abuts against the reflection surface 12 of the light guide plate 1, so as to reduce the total thickness of the backlight module 10.

Figure 5:
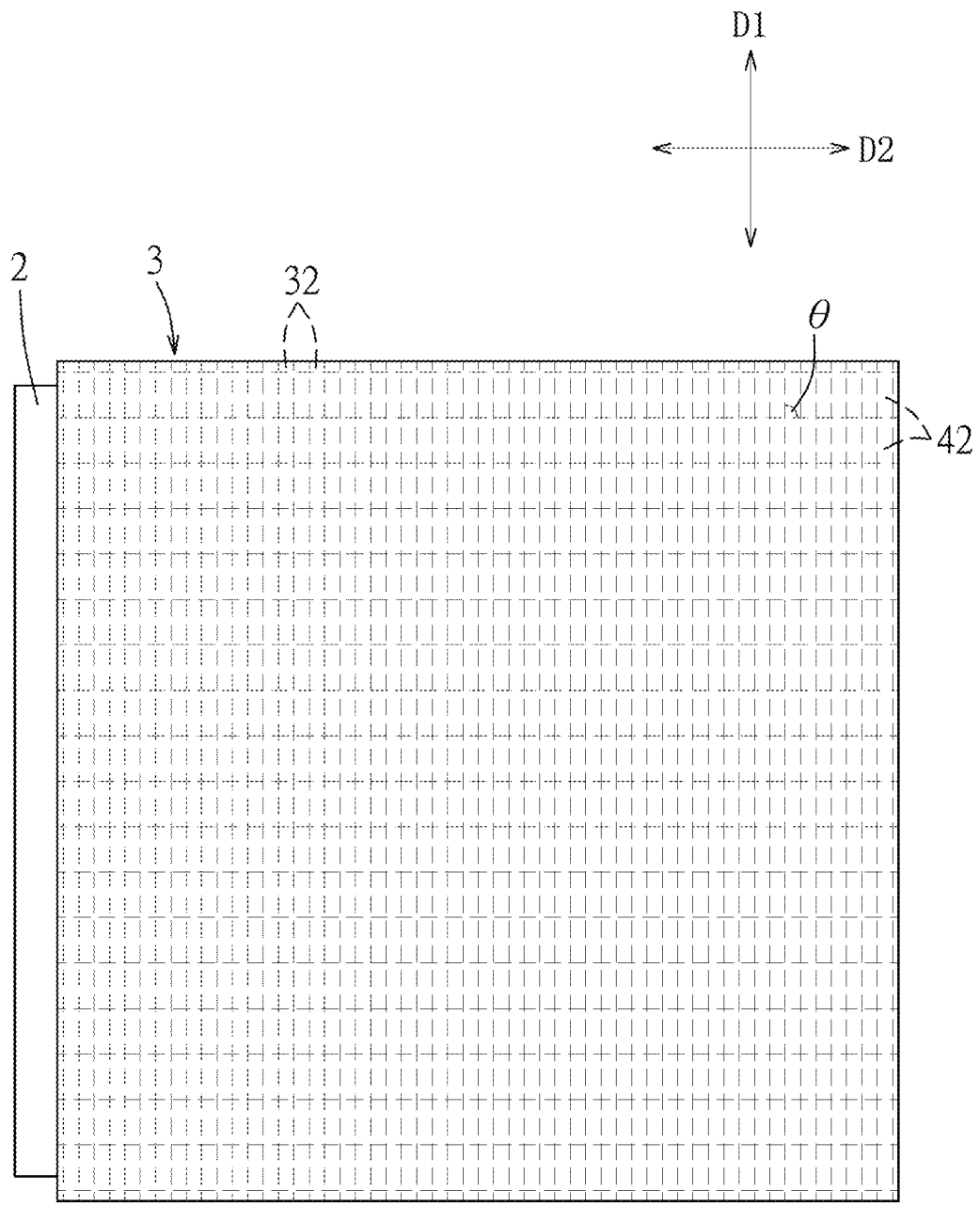
FIG. 5 is a schematic top view illustrating the embodiment of the backlight module according to the disclosure.
Figure 6:
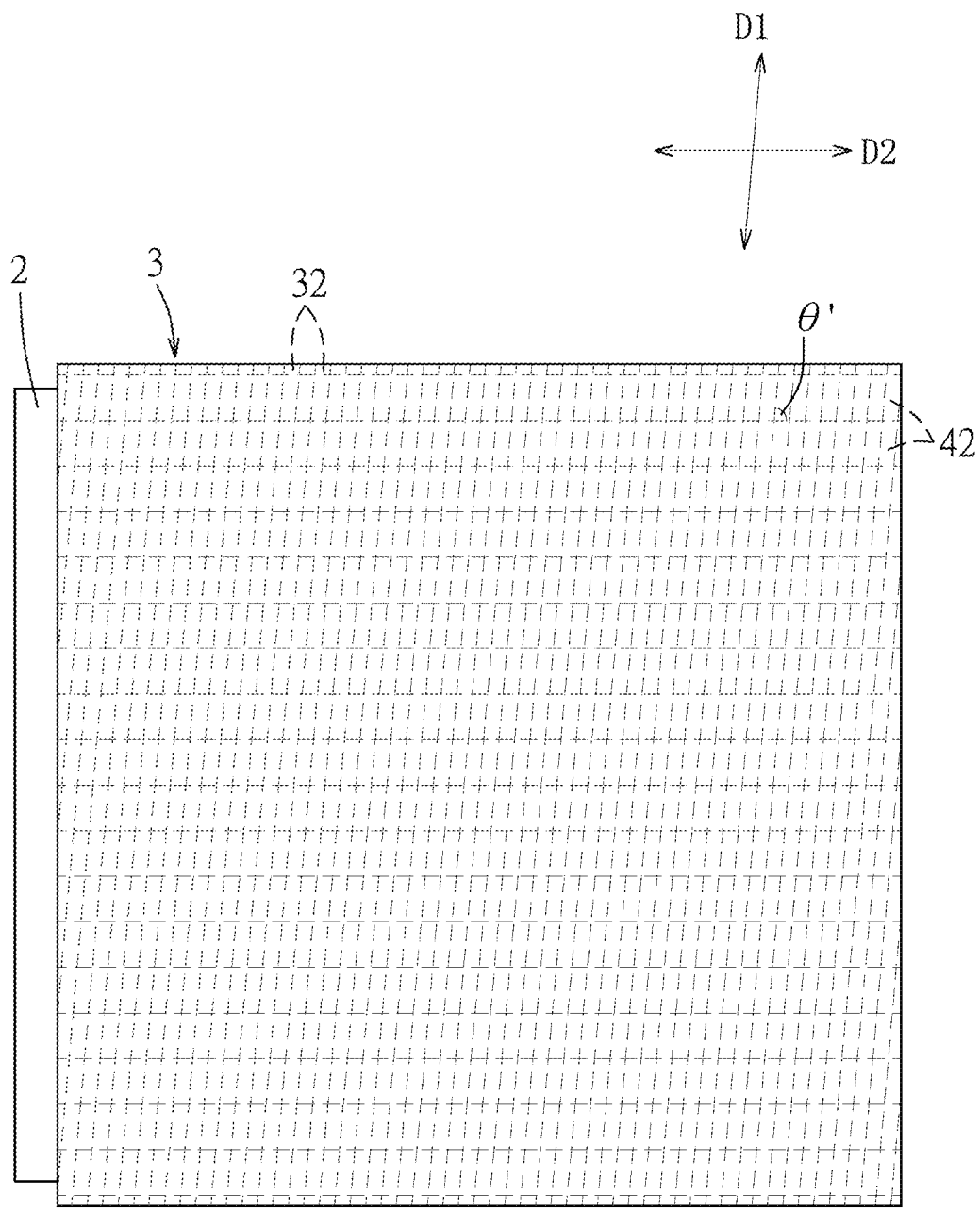
FIG. 6 is a schematic top view illustrating a first variation of the embodiment of the backlight module according to the disclosure.
Figure 7:
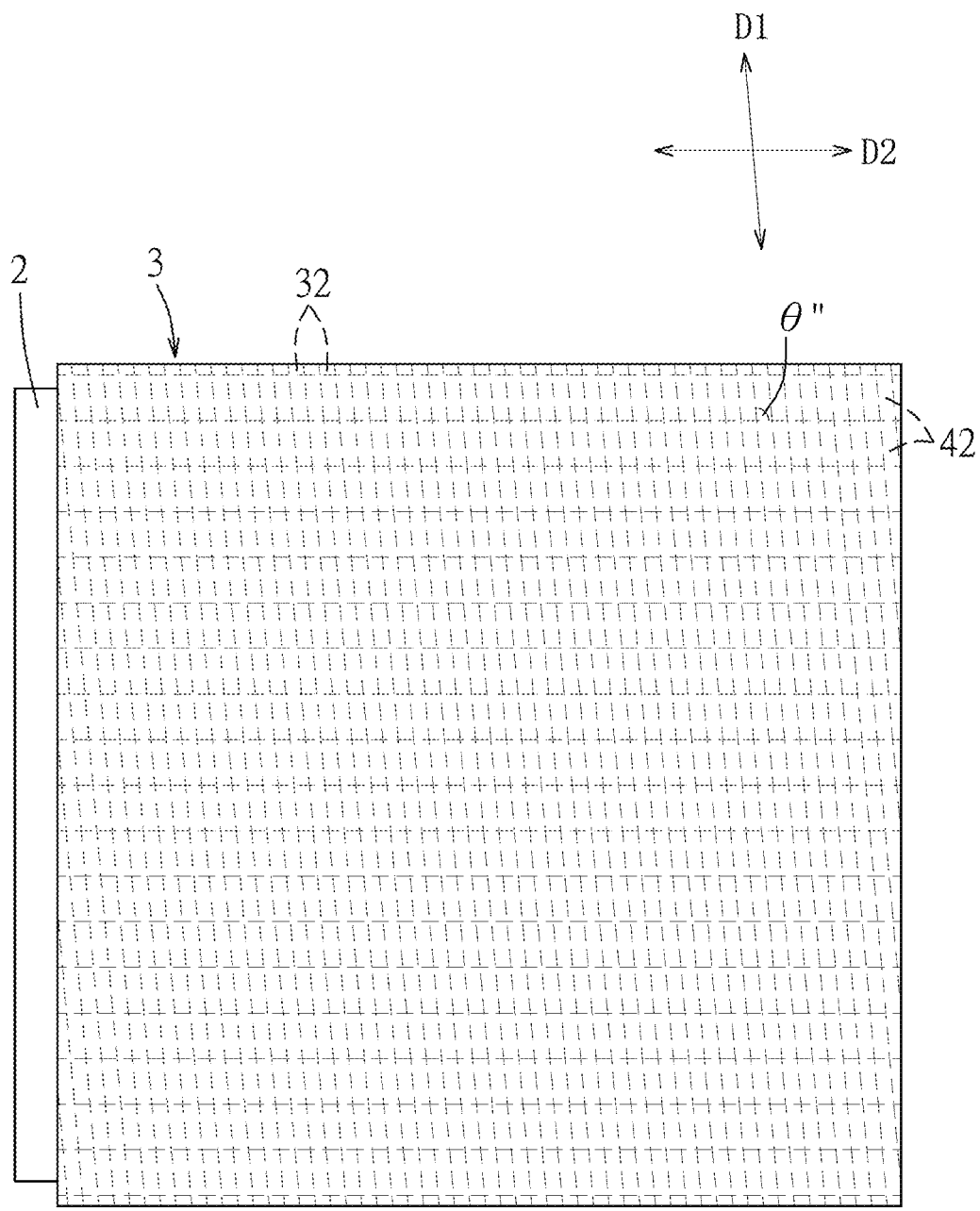
FIG. 7 is a schematic top view illustrating a second variation of the embodiment of the backlight module according to the disclosure.

Referring to FIGS. 5 to 7, each of the first prism structures 32 extends along the first direction D1, and each of the second prism structures 42 extends along a second direction D2. An angle (θ) that is defined between the first direction D1 and the second direction D2 ranges from 85° to 95°. In this embodiment, the angle (θ) is 90°, that is, the first direction D1 is perpendicular to the second direction D2. In a first variation of the embodiment, the angle (θ') is 85°, as shown in FIG. 5. Ina second variation of the embodiment, the angle (θ") is 95°, as shown in FIG. 7.

The light absorbing layer 43 is disposed on the second surface 412. In order to exhibit a dark black appearance, the light absorbing layer 43 may be made from a material selected from the group consisting of an ultra-violet gel, a dark eye, a carbon black, and combinations thereof. The dark eye may be one of an organic molecular material (e.g., an aniline black), an inorganic molecular material (e.g., a carbon black, a black iron oxide, a copper chromite black, a iron chromite black, a cobalt black and an antimony trioxide), and a combination thereof. The absorbing layer 43 may be formed on the second surface 412 by any suitable process, such as a spraying process and a printing process. Alternatively, the absorbing layer 43 may be formed by coating the aforesaid material on the second surface 412, followed by curing the same through a ultra-violet curing process or a hot baking process. In certain embodiments, the light absorbing layer 43 has a thickness ranging from 5 μm to 70 μm, such as 5 μm to 10 μm. The light absorbing layer 43 is configured to absorb the light that is directed out from the light guide plate 1 and that enters the film body 41 without being reflected toward the light guide plate 1 by the second prism structures 42. If the light is not absorbed by the light absorbing layer 43, such light may be reflected toward the light guide plate 1 by the second prism structures 42 due to the total reflection in the film body 41, and then the reflected light may pass through the light guide plate 1, and may be emitted outside the backlight module 10 through the second surface 312 of the sheet body 31 with an increased light-emitting angle, which may fall short of conferring anti-peeping function to the LCD screen.

In use, the light emitted from the light source 2 enters the light guide plate 1 and is directed out of the light guide plate 1 through the reflection surface 12. Then, the light from the light guide plate 1 is incident on and reflected by the second prism structures 42 to adjust the traveling path thereof. The light reflected by the second prism structures 42 is allowed to pass through the light guide plate 1 and then is incident on the first prism structures 32 of the prism sheet 3, where the light is further reflected to adjust the traveling path thereof and then exits from the second surface 312 at a reduced light-emitting angle. In addition, a portion of light which enters the film body 41 without being reflected toward the light guide plate 1 by the second prism structures 42 can be absorbed by the light absorbing layer 43, and does not travel back to the light guide plate 1, such that the backlight module 10 of this disclosure is capable of emitting light with a reduced light-emitting angle.

Figure 2:
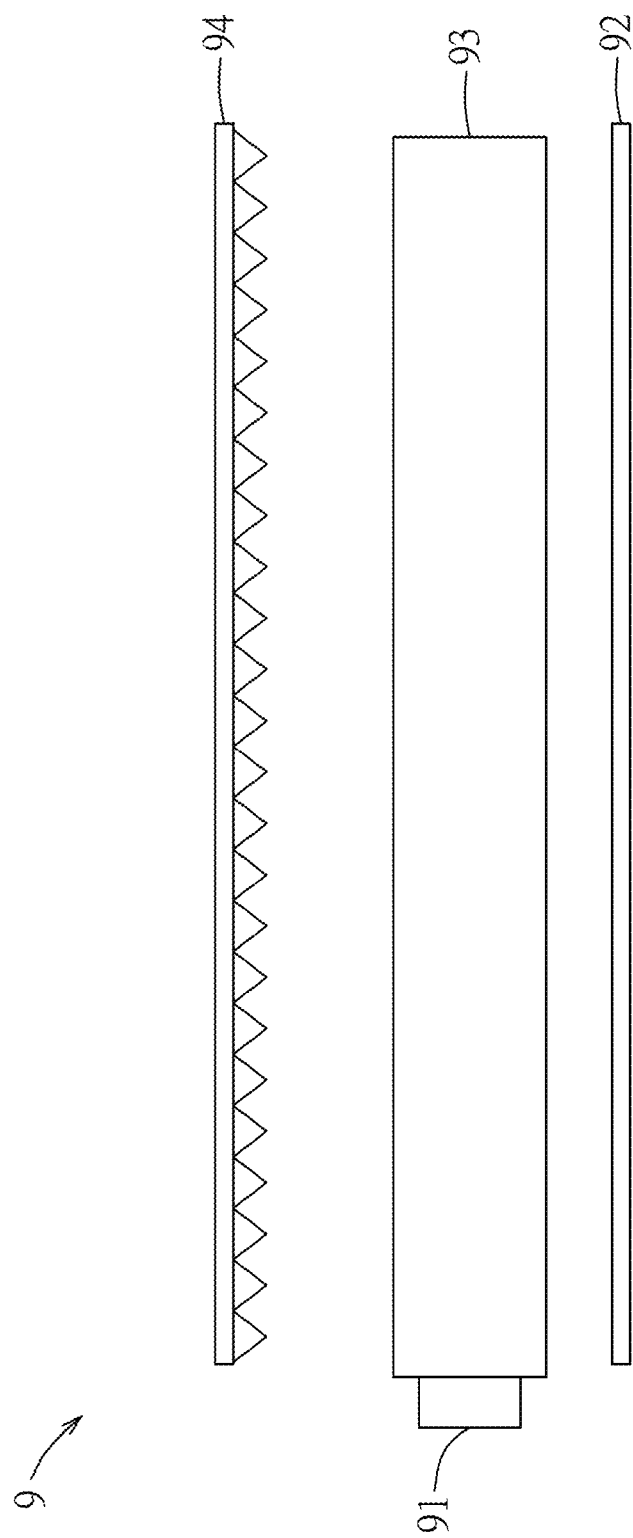
FIG. 2 is a schematic side view illustrating another conventional backlight module.
Figure 8:
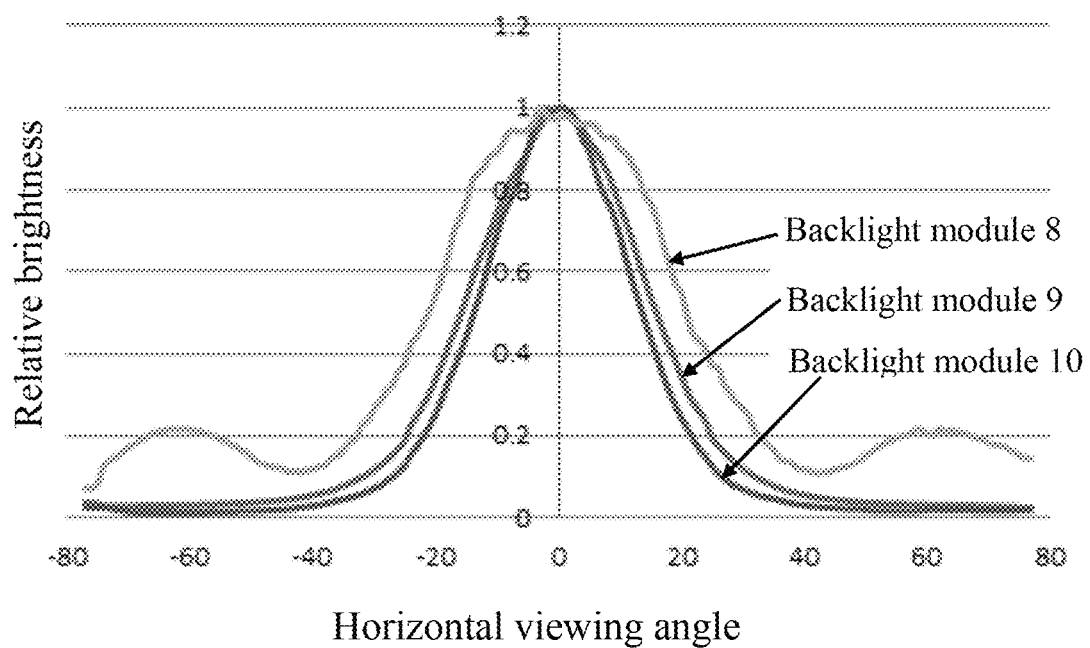
FIG. 8 is a plot showing correlation between the relative brightness and the horizontal viewing angle for the two conventional backlight modules of FIGS. 1 and 2, and the embodiment of the backlight module according to the present disclosure.

FIG. 8 shows a relative brightness of each of the embodiment of the backlight module 10 according to the present disclosure and the two conventional backlight modules 8, 9 shown in FIGS. 1 and 2 at a horizontal viewing angle (i.e. the light-emitting angle) that ranges from −80° to 80°, in which the relative brightness value at the horizontal viewing angle of the backlight module at 0° is set to 1. When the relative brightness value is less than 0.5, image recognition by the human eye is greatly reduced, i.e., difficult to clearly view the content of the displayed image. When the relative brightness value ranges from 0.5 to 1, the content of the displayed image can be clearly viewed by the human eye, and the corresponding horizontal viewing angle range of the backlight module is considered to be a viewing angle range of the human eye. As shown in FIG. 8, the backlight module 10 of the present disclosure can be viewed by the human eye in a viewing angle ranging from −14° to +14°. The conventional backlight module 8 can be viewed by the human eye in a viewing angle ranging from −25° to +25°, and the conventional backlight module 9 can be viewed by the human eye in a viewing angle ranging from −17.5° to +17.5°, each of which has the viewing angle range of the human eye being larger than that of the backlight module 10 of the present disclosure, indicating the backlight module 10 of the present disclosure may exhibit an improved anti-peeping function. Furthermore, the first and second variations of the embodiment of the backlight module 10 of the present disclosure emit light having the brightness that is merely lower than that of the embodiment by about 2%, indicating they still exhibit an anti-peering function superior to those of the conventional backlight modules 8, 9 (not shown).

In summary, by virtue of the reflection film 4 including the second prism structures 42 for reflecting light from the light guide plate 1 back to the light guide plate 1 and the absorbing layer 43 for absorbing the light that is not reflected back to the light guide plate 1 by the second prism structures 42, and by virtue of the first prism structures 32 for further reflecting the light from the reflection film 4 and adjusting the traveling path of the light, the backlight module 10 of the present disclosure is capable of emitting light with a reduced light-emitting angle range and a decreased brightness outside of the light-emitting angle range, so that the LCD screen is conferred with an excellent anti-peeping function.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A backlight module, comprising:
   a light guide plate including a light exit surface, a reflection surface that is opposite to said light exit surface, and a light-incident surface that interconnects said light exit surface and said reflection surface;
   a light source disposed on said light-incident surface of said light guide plate;
   a prism sheet disposed on said light exit surface of said light guide plate, and including a plurality of first prism structures that protrude toward said light exit surface of said light guide plate; and
   a reflective film disposed on said reflection surface of said light guide plate, and including a film body, a plurality of second prism structures that are disposed on said film body and that protrude from said film body toward said reflection surface, and a light absorbing layer that is disposed on said film body opposite to said second prism structures.

2. The backlight module of claim 1, wherein each of said first prism structures of said prism sheet extends along a first direction and each of said second prism structures of said reflective film extends along a second direction, an angle defined between the first direction and the second direction ranging from 85° to 95°.

3. The backlight module of claim 1, wherein the angle defined between the first direction and the second direction is 90°.

4. The backlight module of claim 1, wherein said light absorbing layer is made from a material selected from the group consisting of an ultra-violet gel, a dark dye, a carbon black, and combinations thereof.

5. The backlight module of claim 3, wherein said dark dye is one of an organic molecular material, an inorganic molecular material, and a combination thereof.

6. The backlight module of claim 5, wherein said organic molecular material is an aniline black.

7. The backlight module of claim 5, wherein said inorganic molecular material is selected from the group consisting of a carbon black, a black iron oxide, a copper chromite black, a iron chromite black, a cobalt black and an antimony trioxide.

8. The backlight module of claim 1, wherein said light absorbing layer is formed by one of an ultra-violet coating process, a hot baking process, a printing process, and a spraying process.

9. The backlight module of claim 1, wherein each of said second prism structures of said reflective film abuts against said reflection surface of said light guide plate.

10. The backlight module of claim 1, wherein each of said second prism structures of said reflective film is made from a polymer composite material.

11. The backlight module of claim 10, wherein each of said second prism structures is made from an ultra-violet gel.

12. The backlight module of claim 1, wherein each of said first prism structures is a triangular prism.

13. The backlight module of claim 12, wherein each of said first prism structures has a first apical angle that ranges from 65° to 70°.

14. The backlight module of claim 1, wherein each of said second prism structures is a triangular prism.

15. The backlight module of claim 1, wherein each of said second prism structures has a second apical angle that ranges from 80° to 100°.

16. The backlight module of claim 1, wherein said light absorbing layer has a thickness ranging from 5 μm to 70 μm.

17. The backlight module of claim 1, wherein said film body has a refractive index ranging from 1.4 to 1.7.

\* \* \* \* \*